3,482,939
COPPER DICHALCOGENIDES AND THEIR
PREPARATION
Tom A. Bither, Jr., Wilmington, Del., assignor to E. I.
du Pont de Nemours and Company, Wilmington, Del.,
a corporation of Delaware
No Drawing. Filed Mar. 10, 1965, Ser. No. 438,731
Int. Cl. C01g 3/00; C01b 19/00, 17/00
U.S. Cl. 23—204                                    10 Claims

ABSTRACT OF THE DISCLOSURE

Compounds of copper with sulfur, selenium and tellurium having two atoms of the chalcogen (including mixtures) to one atom of copper, and having the pyrite-type structure, can be made by reacting mixtures containing the elements at a pressure of 30 to 70 kilobars and at a temperature of 600 to 1300° C. The compounds have a relatively high conductivity and are useful as conductive elements and as superconductors at low temperatures.

---

This invention is directed to novel copper dichalcogenides and their preparation. More particularly the invention relates to isomorphous copper dichalcogenides of sulfur, selenium and tellurium having the pyrite-type crystal structure and to their preparation.

The literature has described several attempts to prepare copper dichalcogenides. However, one literature source, G. Gattow and O. Rosenberg, Naturwissensh. 51, 213 (1964), describes all earlier work on copper-sulfur compounds having more than one sulfur atom as actually being mixtures of CuS and sulfur. A copper diselenide is reported to have been prepared, but the resulting product does not have the pyrite-type crystal structure.

Therefore, it is an object of this invention to provide certain copper dichalcogenides having the pyrite-type crystal structure. It is another object to provide a process for producing said dichalcogenides. These and other objects will become apparent hereinafter.

The copper dichalcogenides of the invention can be represented by the formula $$CuS_xSe_yTe_z$$

where $x$, $y$ and $z$ are each numbers of from 0 to 2.1, inclusive; and where $x+y+z$ is equal to $2.0\pm0.1$. These copper dichalcogenides are of the pyrite-type crystal structure which has the symmetry Pa3, contains four molecules of $AB_2$ per unit cell (for pyrite, $FeS_2$, the cell edge is about 5.41 A.), and is designated as structure type C–2 in the Strukturbericht of the Zeitschrift fur Kristallographie.

For purposes of simplicity, the novel compounds are referred to herein as dichalcogenides, or as having the general formula $CuX_2$ where X is the chalcogen, although stoichiometrically some of the products may not analyze exactly in the 1 to 2 elemental ratio. Nonstoichiometric inorganic compounds are well recognized, see, e.g., the Wadsley chapter in Mandelcorn, "Non-stoichiometric Compounds," Academic Press, N.Y. (1964), pages 98–209.

The products of the invention are obtained by heating the reactants to pressures of from about 30–70 kilobars at temperatures of from 600–1300° C., by any one of the following reactions in which X equals the above-specified chalcogens:

(1) $Cu+2X \rightarrow CuX_2$
(2) $Cu_2X+3X \rightarrow 2CuX_2$
(3) $CuX+X \rightarrow CuX_2$
(4) $CuX \rightarrow CuX_2+Cu_{1.8-2.0}X$ 

The preferred ratio of copper to chalcogen in any reaction mixture will be between 1:1.8 to 1:3, but it is to be understood that these ratios are not critical and that the novel products will be produced in ratios outside those preferred.

The reaction is carried out by mixing and pelleting (at 20–40 tons per square inch) the reactants (powders are preferred in order to achieve good mixing) and subjecting them to the above-mentioned temperatures and pressures. The reaction time is not critical, but generally lies between 1–8 hours. Preferably, the reaction temperature lies between 800–1200° C. and the pressure between 60–65 kilobars.

The reaction product may be either slow cooled (100–200° C. per hour) or quenched. The former cooling method produces crystals of a larger size than does the latter method.

The novel products of the invention may appear essentially as a single phase or may appear in discrete sections of the reacted mass along with sections comprising unreacted material and other impurities arising from the nature of the reactants and the reaction conditions employed. The novel dichalcogenides may be easily separated by hand or mechanical means.

To obtain the high pressures necessary in the reaction, a tetrahedral anvil pressure device is employed as described by E. C. Lloyd, et al., Journal of Res., Nat. Bureau Stds. 63C, 59 (1959). In this device, the reactants are placed in a boron nitride container which fits in a graphite sleeve that serves as a resistance heater. This assembly is enclosed in a pyrophyllite tetrahedron and placed in the anvil device.

To establish the quantity of pressure employed by the device, it is necessary to correlate a measurable variable, viz., electrical resistivity, as a function of pressure. The device was pressure calibrated using bismuth, thallium and barium as calibrating materials at room temperature. In all cases, silver chloride was the surrounding medium and the combination was inserted in a 1.25 in. tetrahedron.

The calibration points used appear in the 1963 edition of the American Institute of Physics Handbook, p. 443, as follows (all values for ambient temperature):

Bismuth I→II 25.37±.02 kb.
Bismuth II→III 26.96±0.18 kb.
Thallium II→III 36.69±0.11 kb.
Barium II→III 59.0±1.0 kb.

All compressions in the following examples were made on the cold assembly and the charges then heated to the desired temperature by the appropriate thermocouple. The pressure unit is a bar, equivalent to $10^6$ dynes/cm.$^2$. The larger unit, a kilobar, is consistently shown. No pressure correction for thermocouple behavior has been introduced, standard E.M.F. tables for 1 atm. being employed. Additional details appear in the following examples, which illustrate specific embodiments of the invention.

EXAMPLE 1

Powdered cupric sulfide (CuS) (0.417 g.) was pelleted to give a cylinder about 0.21 inch diameter x 0.25 inch length. This pellet was enclosed within a boron nitride container (0.249 inch diameter x 0.374 inch length, outside dimensions), which was then slipped into a graphite sleeve (0.28 inch diameter x 0.38 inch length, outside dimensions) that served as a resistance heater. The assembly was enclosed in a pyrophyllite tetrahedron (1.25 inches on each edge) and pressure applied on each face. Metal tabs were provided to effect electrical contacts external to the tetrahedron. A thermocouple of Pt–90 Pt/10 Rh was assembled with the junction situated immediately next to the center of the graphite heater measured along the length. Thermocouple leads were led out through edges of the tetrahedron.

The pressure applied was 65 kilobars. After reacting this pressure, the charge was heated at 800° C. for two hours, cooled at 100° C./hr. to 400° C., then quenched to room temperature. A purple and a blue phase were observed when the assembly was opened and the charge removed. The purple phase was separated and its X-ray powder pattern was determined to be:

| Intensity: | d Spacing | hkl |
|---|---|---|
| $M_3$ | 3.348 | 111 |
| S | 2.891 | 200 |
| $M_2$ | 2.590 | 210 |
| $M_2$ | 2.363 | 211 |
| $M_1$ | 2.045 | 220 |
| $M_4$ | 1.932 | 221 |
| S | 1.745 | 311 |
| $M_3$ | 1.668 | 222 |
| $M_3$ | 1.604 | 320 |
| $M_3$ | 1.545 | 321 |
| F | 1.401 | 322 |
| V | 1.363 | 411 |
| $M_3$ | 1.326 | 331 |
| $M_4$ | 1.292 | 420 |
| $M_4$ | 1.261 | 421 |
| F | 1.232 | 332 |
| $M_4$ | 1.180 | 422 |
| F | 1.156 | 430 |
| $M_4$ | 1.134 | 431 |
| $M_2$ | 1.112 | 511 |
| $M_4$ | 1.073 | 432 |
| $M_4$ | 1.055 | 521 |
| $M_3$ | 1.023 | 440 |
| V | 1.007 | 522 |
| $M_4$ | 0.9781 | 531 |
| $M_3$ | 0.9645 | 600 |
| $M_3$ | 0.9386 | 611 |
| F | 0.9148 | 620 |
| $M_2$ | 0.9039 | 621 |
| V | 0.8930 | 541 |
| $M_4$ | 0.8824 | 533 |
| $M_4$ | 0.8724 | 622 |
| V | 0.8626 | 630 |
| F | 0.8532 | 631 |
| $M_4$ | 0.8266 | 632 |
| F | 0.8186 | 543 |
| $M_4$ | 0.8104 | 711 |
| $M_2$ | 0.8026 | 640 |
| $M_4$ | 0.7950 | 641 |
| $M_4$ | 0.7877 | 721 |

This powder pattern could be indexed on the basis of a primitive cubic cell of edge length $a_0$–5.785 A. The intensities of the lines approximately matched those of pyrite, $FeS_2$.

Sulfur analysis gave 49.91%, indicating the formula $CuS_{1.99}$. The measured density was 4.354 g./cc. and the density calculated for four molecules of $CuS_2$ per unit cell was 4.379 g./cc.

The blue phase was demonstrated to be $Cu_{1.8}S$ plus some unreacted CuS. Thus, the reaction was a disproportionation of CuS, i.e., $3CuS \rightarrow Cu_{1.8}S + CuS_2$.

Examination of the product indicated essentially no involvement of the boron nitride container.

EXAMPLE 2

Example 1 was repeated with the exception that an initial temperature of 1200° C. and a cooling rate of 200° C./hr. were employed. The purple phase was separated and its X-ray powder pattern proved to be the same as that of the $CuS_2$ phase of Example 1.

A single crystal study confirmed the cubic symmetry of this $CuS_2$ phase and the space group was demonstrated to be that of pyrite, namely, Pa3. The cell edge was found to be $a_0$–5.78 A.

Electrical measurements carried out on a second sample of $CuS_2$ prepared in a similar manner indicated it to be a good conductor with a metal-like resistance-temperature behaviour. Resistivity values at a series of temperatures were as follows:

| Resistivity, $\rho$, ohm cm.: | Temp., ° K. |
|---|---|
| $2.5 \times 10^{-6}$ | 4 |
| $1.6 \times 10^{-5}$ | 50 |
| $4.0 \times 10^{-5}$ | 100 |
| $8.0 \times 10^{-5}$ | 200 |
| $1.1 \times 10^{-4}$ | 300 |
| $1.5 \times 10^{-4}$ | 400 |

An absorption spectra carried out on a mineral oil mull of this $CuS_2$ phase showed a minimum in the optical density at approximately 2.2 e.v. (red visible).

EXAMPLE 3

Cuprous sulfide ($Cu_2S$) (0.350 g.) and 0.211 g. of sulfur were mixed and 0.440 g. of the mixture pelleted and heated for 2 hours at 800° C., followed by slow-cooling at 100° C. per hour to 400° C., then quenching to room temperature. Pressure used was 65 kilobars, obtained by the apparatus described in Example 1. The resulting copper disulfide had the pyrite-type crystal structure with a cell edge of $a_0$–5.785 A.

This run was repeated at 1200° C. with the same results.

EXAMPLE 4

Cupric sulfide (CuS) (0.382 g.) and 0.128 g. of sulfur were mixed and reacted by the procedure of Example 1 and the product, $CuS_2$ with the pyrite-type crystal structure, obtained.

A second run at 1200° C. yielded the same product.

Thermal stability studies carried out by differential thermal analysis, thermogravimetric analysis, and elevated temperature X-ray investigation of the $CuS_2$ indicated that this phase decomposed at one atmosphere pressure in the temperature range 200–250° C. to CuS plus S.

EXAMPLE 5

Copper powder (0.381 g.) and 0.358 g. of sulfur were mixed and a portion treated as in Example 1 by heating to 1200° C. in one hour, holding at this temperature for one hour, followed by slow cooling at 200° C. per hour to 400° C., then quenching to room temperature. This procedure was carried out at a pressure of 65 kilobars. Essentially complete conversion to purple crystals of $CuS_2$ having the pyrite-type structure resulted. Analyses confirmed the ratio of copper to sulfur atoms to be 1:2.

A portion of this product was incorporated in series into two electrical circuits containing (in series) either a 3 volt D.C. battery source and 3 volt bulb or a 65 volt A.C. power source and a 60 volt neon bulb. Upon closing the circuits, the bulbs lighted brightly, indicating good conductivity of the copper disulfide of the invention.

EXAMPLE 6

Cuprous sulfide ($Cu_2S$) (0.420 g.) and 0.253 g. of sulfur were mixed and a portion reacted at 800° C. at a pressure of 37 kilobars, in the manner of Example 1. The resulting purple phase was identified as crystals of $CuS_2$ with the pyrite-type structure. The product was found to be a good conductor with a metal-like resistance-temperature behavior. Resistivity values at a series of temperatures were as follows:

| Resistivity, $\rho$, ohm cm.: | Temp., ° K. |
|---|---|
| $2.5 \times 10^{-7}$ | 14 |
| $5.5 \times 10^{-5}$ | 100 |
| $1.5 \times 10^{-4}$ | 300 |

EXAMPLE 7

Copper powder (0.402 g.) and 1.000 g. of selenium were mixed and 0.633 g. of the mixture treated as in Example 1 by heating to 1200° C. in one hour and holding at this temperature for one hour. This was followed by cooling to 400° C. at a rate of 200° C./hour, then quenching to room temperature. A brittle, blue-black crystalline solid resulted. Single crystal X-ray work showed the crystals had the pyrite-type structure (space group Pa3). From the X-ray powder pattern, a cell edge of $a_0$–6.103

A. was calculated. The X-ray powder pattern for the CuSe$_2$ product is as follows:

| | d Spacing | hkl |
|---|---|---|
| Intensity: | | |
| F | 3.517 | 111 |
| S | 3.045 | 200 |
| S | 2.728 | 210 |
| S | 2.493 | 211 |
| M$_2$ | 2.154 | 220 |
| M$_3$ | 2.030 | 221 |
| S | 1.840 | 311 |
| M$_3$ | 1.763 | 222 |
| S | 1.691 | 320 |
| S | 1.630 | 321 |
| M$_3$ | 1.522 | 400 |
| M$_3$ | 1.478 | 322 |
| M$_4$ | 1.437 | 411 |
| M$_4$ | 1.397 | 331 |
| M$_4$ | 1.363 | 420 |
| M$_2$ | 1.331 | 421 |
| M$_3$ | 1.299 | 332 |
| M$_3$ | 1.245 | 422 |
| M$_4$ | 1.220 | 430 |
| M$_4$ | 1.196 | 431 |
| M$_1$ | 1.175 | 511 |
| M$_2$ | 1.134 | 432 |
| M$_3$ | 1.115 | 521 |
| M$_2$ | 1.079 | 440 |
| F | 1.062 | 522 |
| F | 1.044 | 433 |
| M$_3$ | 1.017 | 600 |
| M$_4$ | 1.003 | 610 |
| M$_2$ | 0.990 | 611 |
| M$_3$ | 0.954 | 621 |
| V | 0.941 | 541 |
| M$_3$ | 0.931 | 533 |
| F | 0.920 | 622 |
| M$_3$ | 0.910 | 630 |
| M$_3$ | 0.900 | 631 |

Electrical measurements indicated the CuSe$_2$ to be an excellent conductor with metal-like resistance-temperature behavior. Resistivity values at a series of temperatures were as follows:

| Resistivity, $\rho$, ohm cm.: | Temp., °K. |
|---|---|
| $1.2 \times 10^{-7}$ | 4 |
| $7.5 \times 10^{-5}$ | 298 |
| $1 \times 10^{-4}$ | 400 |

By application of the Meissner technique, this material was demonstrated to be a superconductor with a sharp transition, the midpoint of which was 2.37° K.

EXAMPLE 8

A 0.875 g. sample from a mixture of 0.249 g. of powdered copper and 1.000 g. of tellurium was prepared and treated by the procedure of Example 7. A silver-gray metal-like product resulted. Single crystal X-ray work showed that the product had the pyrite-type structure (space group Pa3). From the following X-ray powder pattern, a cell edge of $a_0$–6.600 A. was calculated.

| | d Spacing | hkl |
|---|---|---|
| Intensity: | | |
| F | 3.814 | 111 |
| M$_4$ | 3.299 | 200 |
| S | 2.957 | 210 |
| M$_1$ | 2.688 | 211 |
| M$_2$ | 1.983 | 311 |
| M$_2$ | 1.833 | 320 |
| M$_2$ | 1.767 | 321 |
| M$_3$ | 1.649 | 400 |
| M$_3$ | 1.439 | 421 |
| M$_3$ | 1.405 | 332 |
| M$_3$ | 1.270 | 511 |
| M$_3$ | 1.227 | 432 |
| M$_3$ | 1.203 | 521 |
| M$_3$ | 1.166 | 440 |
| M$_3$ | 1.069 | 611 |
| F | 0.005 | 533 |
| F | 0.983 | 630 |
| F | 0.973 | 631 |
| M$_4$ | 0.906 | 641 |

Electrical measurements carried out on this CuTe$_2$ phase indicated it to have a metal-like resistance-temperature behavior. Resistivity values at a series of temperatures were as follows:

| Resistivity, $\rho$, ohm cm.: | Temp., °K. |
|---|---|
| $5.5 \times 10^{-5}$ | 4 |
| $5.0 \times 10^{-4}$ | 298 |
| $7.0 \times 10^{-4}$ | 400 |

EXAMPLE 9

A 0.566 g. sample of a mixture of 0.381 g. of copper powder, 0.192 g. of sulfur and 0.474 g. of selenium was prepared and treated by the procedure of Example 7. A brittle, blue-black, crystalline solid resulted.

Its X-ray powder pattern indexed as cubic, $a_0$–5.923 A. (space group Pa3). This cell dimension, lying approximately half way between those of the two end members, i.e., CuS$_2$, $a_0$–5.785 A. and CuSe$_2$, $a_0$–6.103 A., indicates a phase CuS$_x$Se$_y$ wherein the sum of $x$ plus $y$ is essentially 2. Electrical measurements on this phase indicated it to have a metal-like resistance-temperature behavior. Resistivity values at a series of temperatures were as follows:

| Resistivity, $\rho$, ohm cm.: | Temp., °K. |
|---|---|
| $4 \times 10^{-4}$ | 4 |
| $1.1 \times 10^{-3}$ | 300 |
| $1.3 \times 10^{-3}$ | 375 |

By application of the Meissner technique, this material was demonstrated to be a superconductor with a sharp transition, the midpoint of which was 1.8° K.

EXAMPLE 10

A 0.705 g. sample of a mixture of 0.254 g. of copper powder, 0.316 g. of selenium and 0.510 g. of tellurium was prepared and treated as in Example 7. A silver-grey metal-like product resulted. The X-ray powder pattern showed the presence of two distinct cubic phases with cell edges of 6.302 A. and 6.234 A. Both had the proper systematic absences for the Pa3 space group. These cell dimensions, lying between those of the two end members, i.e., CuSe$_2$, $a_0$–6.103 A. and CuTe$_2$, $a_0$–6.600 A., indicate phases CuSe$_y$Te$_z$ wherein the sum of $y$ plus $z$ is essentially 2.

This material was demonstrated to be a superconductor and the midpoint of the transition was 1.9° K.

The reactants employed in the foregoing examples may be used as obtained commercially.

As shown in the examples, the novel products have the pyrite-type crystal structure. However, when the product is a mixed chalcogenide, i.e., when more than one chalcogen is present, the crystal structure may be converted to the derivative cobaltite-type structure (structure type FO$_1$) if the distribution of the chalcogen atoms becomes ordered. Such ordering could occur through an annealing process applied to the randomly distributed chalcogens initially obtained in the process of the invention.

The novel products of this invention have a metal-like resistance vs. temperature behavior with relatively high conductivity, particularly at low temperatures. Thus, at liquid helium temperature, the CuS$_2$ and CuSe$_2$, for example, show resistivities only some 10 times that of copper metal; and at room temperatures, some 100 times that of copper. In particular, the CuSe$_2$ product of this invention becomes a superconductor below about 2.37° K., and the CuS$_x$Se$_y$ and CuSe$_y$Te$_z$ products of this invention become superconductors below about 1.8° K. and 1.9° K. respectively. The Meissner effect, used to demonstrate the superconductivity of the products of this invention, is described by W. Meissner and R. Ochsenfeld, Naturwissensh. 21, 787 (1933). The CuS$_2$ product of the invention has a minimum in its absorption spectra in the visible red region.

The copper dichalcogenides of the invention do not become ferromagnetic at low temperatures as do some known dichalcogens of this same structure. The CuS$_2$ product of the invention has been determined to decompose to CuS and S in the temperature range of 200–250° C.

As previously shown, the products of the invention are useful as electrical conductors, especially in applications where metal-like resistance is desirable, and in particular as superconductors at very low temperatures.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Copper dichalcogenides of the formula $$CuS_xSe_yTe_z$$

wherein each of $x$, $y$ and $z$ is a number of from 0 to 2.1, inclusive; and wherein $x+y+z$ is equal to $2.0\pm0.1$; said dichalcogenides having the pyrite-type crystal structure.

2. The compound of the formula $CuS_{2.0\pm0.1}$ having the pyrite-type crystal structure.

3. The compound of claim 2 wherein the cell edge is about 5.785 A.

4. The compound of the formula $CuSe_{2.0\pm0.1}$ having the pyrite-type crystal structure.

5. The compound of claim 4 wherein the cell edge is about 6.103 A.

6. The compound of the formula $CuTe_{2.0\pm0.1}$ having the pyrite-type crystal structure.

7. The compound of claim 6 wherein the cell edge is about 6.600 A.

8. A compound of the formula $CuS_xSe_y$ wherein each of $x$ and $y$ is a number of from 0 to 2.1, inclusive; wherein $x+y$ is equal to $2.0\pm0.1$; and wherein said compound has the pyrite-type crystal structure.

9. compound of the formula $CuSe_yTe_z$ wherein $y$ and $z$ are a number of from 0 to 2.1, inclusive; wherein $y+z$ is equal to $2.0\pm0.1$; and wherein said compound has the pyrite-type crystal structure.

10. A process for preparing copper dichalcogenides of the formula $CuX_{2.0\pm0.1}$ having the pyrite-type crystal structure wherein X is selected from the group consisting of sulfur, selenium, tellurium, and mixtures thereof; which comprises subjecting one of the group of reactants selected from the group consisting of (a) Cu and X, (b) $Cu_2X$ and X, (c) CuX and X, and (d) CuX to a pressure between 30 and 70 kilobars, and a temperature between 600 and 1300° C.

References Cited

UNITED STATES PATENTS 3,375,071   3/1968   Young _____ 23—50

OTHER REFERENCES

Chemical Abstracts: vol. 49, 1955, p. 15394e: Borchert et al. (Tech. Hochschule, Munich, Ger.), Heidelberger Beitr. Mineral, u. Petrog. Mitt. 4, 434–442 (1955).

Gattow et al.: Naturauissenschaften 51, 213 (1964).

Hogart et al., "Comptes Rendus," vol. 234, pages 111–113 (1952).

Riolo et al., "Gazetta Chimica Italiana," vol. 86, pages 1162–1167 (1956).

OSCAR R. VERTIZ, Primary Examiner

HOKE S. MILLER, Assistant Examiner

U.S. Cl. X.R.

23—55, 135, 315